United States Patent [19]

Grunza

[11] 4,063,031

[45] Dec. 13, 1977

[54] SYSTEM FOR CHANNEL SWITCHING BASED ON SPEECH WORD VERSUS NOISE DETECTION

[75] Inventor: Gene Grunza, Blackwood, N.J.

[73] Assignee: Threshold Technology, Inc., Delran, N.J.

[21] Appl. No.: 678,299

[22] Filed: Apr. 19, 1976

[51] Int. Cl.² .......................... H04B 1/06; H04K 5/20
[52] U.S. Cl. ................................ 179/1 P; 179/1 SD; 325/304
[58] Field of Search .............. 179/1 P, 1 SD; 325/304

[56] References Cited

U.S. PATENT DOCUMENTS

| | | | |
|---|---|---|---|
| 3,495,175 | 2/1974 | Munch | 325/304 |
| 3,577,087 | 5/1971 | Martin | 179/1 SD |
| 3,588,363 | 6/1971 | Herscher | 179/1 SD |
| 3,745,467 | 7/1973 | Lundquist et al. | 325/304 |
| 3,860,872 | 1/1975 | Richardson | 325/304 |
| 3,902,123 | 8/1975 | Ooman | 179/1 P |

Primary Examiner—Kathleen H. Claffy
Assistant Examiner—E. S. Kemeny
Attorney, Agent, or Firm—Martin Novack

[57] ABSTRACT

An apparatus for signal-in-noise enhancement by useful-channel selection, includes automatic channel switching if words of a predetermined speech vocabulary are not detected within a predetermined interval. In accordance with the invention there are provided first and second parallel channels to which audio signals are applied. A channel selector, such as a voltage controlled switch, is responsive to a control signal for selecting the first or the second channel. A speech word recognition subsystem is provided and is responsive to the audio signals transmitted over the selected channel. The speech recognition subsystem determines the presence of speech-like sounds and generates a speech-indicative signal as a function thereof. Portions of the audio signals which occur during the speech-indicative signal are compared with the predetermined vocabulary to determine the probable occurrence of a word from among the predetermined vocabulary, and an occurrence indication signal is generated when a vocabulary word is detected. A control signal is generated in response to the output of the speech word recognition subsystem, the control signal being a function of the speech-indicative signal and the occurrence indication signal. In operation, the control signal is operative, in response to the presence of extraneous signals on a channel being utilized, to effect switching to the other channel. In the preferred embodiment, the speech recognition subsystem generates reject signals when the speech-indicative signal persists for a prescribed time without an occurrence indication occurring, and the control signal is generated in response to the reject signals.

10 Claims, 1 Drawing Figure

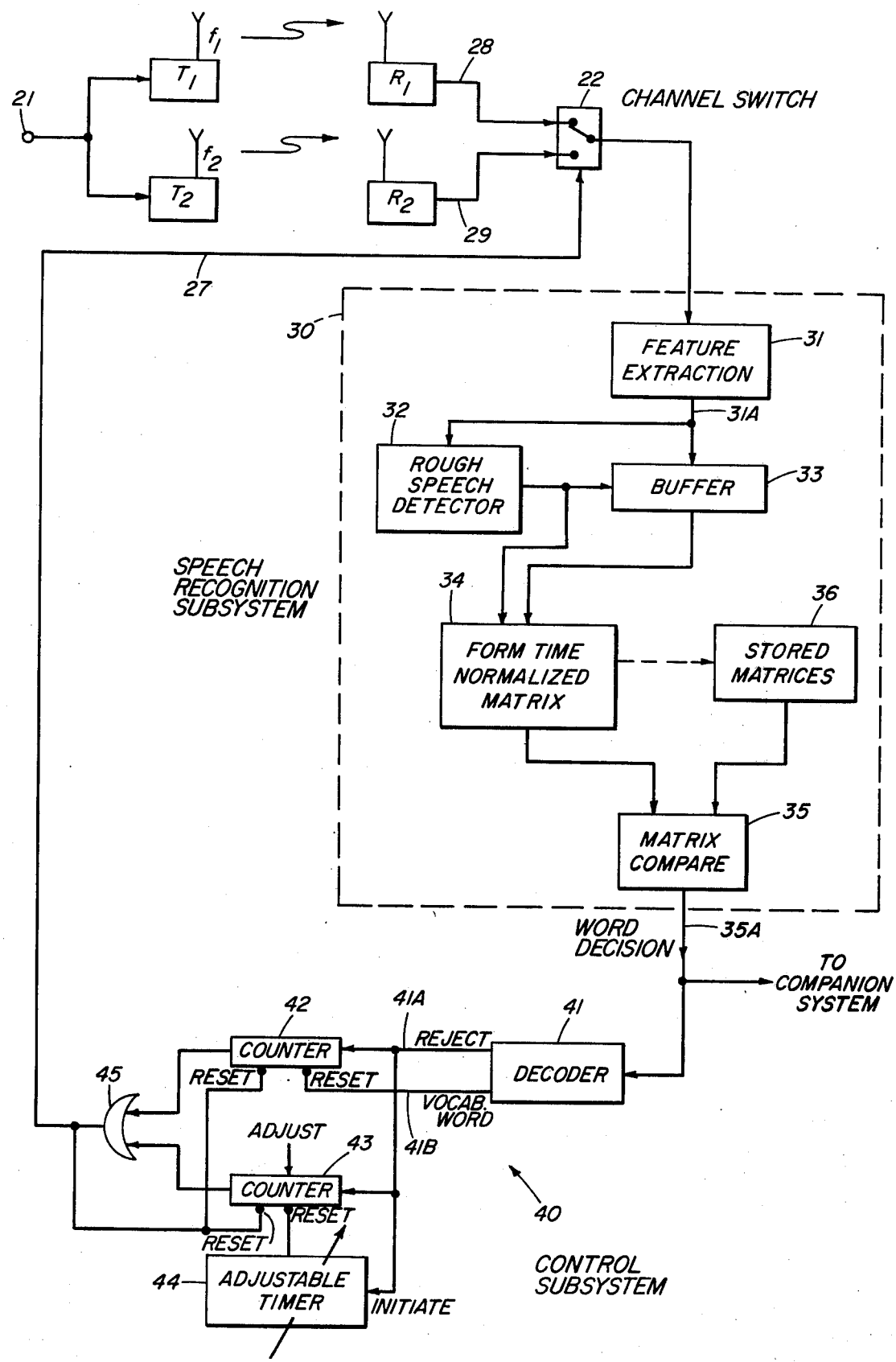

SYSTEM FOR CHANNEL SWITCHING BASED ON SPEECH WORD VERSUS NOISE DETECTION

BACKGROUND OF THE INVENTION

This invention relates to communication and control systems, and, more particularly, to a system for transmitting and receiving audio signals containing speech information over a pair of parallel channels with improved accuracy.

In various applications of the transmission of information, redundant transmission channels are available, and the quality of the transmission can be improved by sensing the presence of noise on one channel and thereupon switching the transmission to the other channel to increase signal-to-noise ratio. Of course, this technique is limited by the ability to sense the noise and distinguish it from the signals being transmitted.

Speech recognition equipments have recently begun to gain commercial acceptance in voice command applications. A speech recognition equipment is typically programmed to understand a restricted vocabulary of spoken words and to distinguish between these spoken words with a relatively high degree of accuracy. When a particular word from among the restricted vocabulary is spoken, the speech recognition equipment generates an occurrence indication which is indicative of the word which was spoken, and the occurrence indication is used to control a companion system. For example, the companion system may respond to the speech command by routing an object to a particular location which was spoken by an operator or by recording inventory information spoken by the operator.

A single speech recognition equipment can be time-shared from a number of operator stations so that operators at different locations can send oral commands over transmission channels to the speech recognition equipment. The speech recognition equipment responds, such as by feeding appropriate inventory or routing information (corresponding to the oral commands) to a computer or companion system. In this type of application two or more redundant channels may be available from each operating location, and it would be desirable to have the ability to detect the presence of noise on one channel so that an alternate channel could be selected for use in the transmission. For example, each remote location may transmit the speech information to the word recognition equipment over a radio link, with each link having two available frequency bands for the transmission. Typically, the frequencies available for use for this type of a setup are commercially allocated portions of the spectrum wherein power restrictions are in effect. At these allocated frequencies, cross-talk and interfering signals from unrelated two-way radio signals become a problem. Typically, the interfering signals would be of the form of speech, so conventional techniques wherein "noise" is detected in order to switch away from a "noisy" channel would not be viable since the very speech signals to be transmitted are characteristically similar to the expected noise. A problem, therefore, is how to make optimum use of redundant transmission channels where speech recognition equipment is employed at the receiver end.

It is an object of the present invention to provide a solution to this problem.

SUMMARY OF THE INVENTION

The present invention is directed to an apparatus for transmitting and receiving audio signals including recognizable speech information of a predetermined restricted vocabulary. In accordance with the invention there are provided first and second parallel channels and means for applying the audio signals to the first and second channels. Channel selecting means, such as a voltage controlled switch, is responsive to a control signal for selecting the first or the second channel. A speech recognition subsystem is provided and is responsive to the audio signals transmitted over the selected channel. The speech recognition subsystem includes means for determining the presence of speech-like sounds and for generating a speech-indicative signal as a function thereof, and further includes means for comparing portions of the audio signals with the predetermined vocabulary to determine the probable occurrence of a word from among the predetermined vocabulary and for thereupon generating an occurrence indication signal. Finally, control means, coupled to the speech recognition subsystem, is provided for generating the control signal as a function of the speech-indicative signal and the occurrence indication signal. The control signal is operative, in response to the presence of extraneous signals on a channel being utilized, to effect switching to the other channel.

In a preferred embodiment of the invention the speech recognition subsystem generates reject signals when the speechindicative signal persists for a prescribed time without an occurrence indication occurring, and the control means is operative in response to the reject signals for generating the control signal.

Further features and advantages of the invention will become more readily apparent from the following detailed description when taken in conjunction with the accompanying drawing.

BRIEF DESCRIPTION OF THE DRAWING

The drawing is a schematic block diagram representation of an embodiment of the invention for transmitting and receiving audio signals including recognizable speech information of a predetermined restricted vocabulary over a pair of channels.

DESCRIPTION OF THE PREFERRED EMBODIMENT

Referring to the drawing, there is shown a schematic block diagram of an apparatus in accordance with an embodiment of the invention. In broad terms, an operator speaks voice commands into a microphone 21 and these commands are transmitted to a receiving location at which a speech recognition equipment 30 is employed to recognize the spoken voice commands of the operator. The speech recognition equipment generates signals which control the operation of a companion system, such as a computer. In accordance with the invention, signals from the microphone 21 are coupled to a pair of transmitters $T_1$ and $T_2$ which are adapted to transmit the signals at characteristic frequencies designated $f_1$ and $f_2$, respectively. A pair of receivers $R_1$ and $R_2$ are tuned to the frequencies $f_1$ and $f_2$, respectively and perform the conventional demodulation processes to generate output signals on lines 28 and 29, respectively. The signals on lines 28 and 29 are coupled through an electronic switch 22, typically a semiconductor switch, to a speech recognition subsystem 30. The signal selected for coupling to the system 30 is a function of a control signal on a line labeled with reference numeral 27.

The speech recognition subsystem 30 may be of the type described in the copending U.S. application Ser. No. 531,543, assigned to the same assignee as the present invention, or the model VIP-100 speech recognition apparatus which is available commercially from Threshold Technology Inc. of Delran, New Jersey. In particular, the subsystem 30 includes a feature extraction means 31 which is coupled to a "rough speech detector" 32 and a buffer memory 33. The outputs of the units 32 and 33 are coupled to a means 34 for forming a time normalized matrix. The output of unit 34 is, in turn, coupled to a matrix comparison unit 35 which also receives stored matrix information from a unit 36.

In operation, the circuitry 31 processes received audio signals and generates a plurality of feature signals on a plurality of lines designated by cable 31A. The "rough speech detector" 32, sometimes referred to as a "speech boundary detector," determines the onset and offset of speech-like sounds by processing the features which occur. A suitable technique is described in copending U.S. application Ser. No. 556,633, assigned to the same assignee as the present invention. When speech-like sounds of sufficient duration to be a potential spoken word are detected, the buffer 33 is signalled to feed the feature signals which occurred during the detected period to the matrix formation means 34. This unit forms a time normalized matrix of the features which occurred during the detected period. The formed matrix is compared with each of a number of matrices stored (in unit 36) beforehand and representative of the words in the system's restricted vocabulary. When the matrix comparison unit 35 detects a sufficient degree of similarity to one of the stored matrices, it generates a coded signal at its output 35A which indicates the occurrence of the particular word. However, if there is insufficient similarity to any of the stored matrices, the coded output indicates a "reject;" i.e., that the apparent "word" spoken does not match any word in the stored vocabulary with a sufficient degree of correlation.

The signal at output 35A is coupled to a control means 40 which generates the control signal on line 27. Specifically, the coded signal on 35A is received by a decoder 41 which determines whether the signal had indicated a vocabulary word or a reject. A reject generates a signal on a line 41A and a signal indicative of any vocabulary word results in a signal on line 41B. The line 41A is coupled to the input of a "count to two" counter 42 which is reset to zero by the signal on line 41B. An output of the counter 42 occurs when the counter reaches a count of two. Line 41A is also coupled to a counter 43 which can be adjusted to generate an output signal upon reaching a desired count. An adjustable timer 44, initiated by a reject signal on line 41A, resets the counter 43 after a selected period. The outputs of the counters 42 and 43 are coupled to an OR gate 45, the output of which is line 27. An output on line 27 switches the switch 22 and resets both counters to zero.

In operation, two reject signals in a row on line 41A will cause an output from counter 42 which, in turn, produces an output from OR gate 45 on line 27. The detection of a vocabulary word causes a signal on line 41B which resets counter 42, so two reject signals in a row are required to cause an output from counter 42. An alternate criterion for switching channels is the occurrence of more than a predetermined number of reject signals per unit time. For example, the counter 43 can be adjusted to generate an output upon reaching a given count, such as three, and the timer 44 can be set to a given cycle time, such as thirty seconds. The timer is reinitiated each time a reject signal occurs, so for the given example the counter 43 is not reset until 30 seconds have passed without three rejects occurring. Accordingly, in the embodiment shown, the channel will be switched when either a predetermined number of rejects occur in a row or when more than a predetermined number of rejects occur per unit time.

The invention has been described with reference to a particular embodiment, but variations within the spirit and scope of the invention will occur to those skilled in the art. For example, it will be understood that the invention is applicable to a situation where more than two redundant channels are available. Also, appropriate means could be provided for disabling a particular channel not in use. Finally, it will be understood that other functions of the reject signal can be generated to effect switching as desired.

I claim:

1. Apparatus for transmitting and receiving audio signals including recognizable speech information of a predetermined restricted vocabulary, comprising:
   a. first and second parallel channels;
   b. means for applying said audio signals to said first and second channels;
   c. channel selecting means responsive to a control signal for selecting said first or second channel;
   d. a speech recognition subsystem responsive to the audio signals transmitted over the selected channel, said speech recognition subsystem including means for determining the presence of speech-like sounds and for generating a speech-indicative signal as a function thereof, and means responsive to said speech-indicative signal for comparing portions of said audio signals with said predetermined vocabulary to determine the probable occurrence of a word from among said predetermined vocabulary and for thereupon generating an occurrence indication signal; and
   e. control means coupled to said speech recognition subsystem for generating said control signal as a function of said speech-indicative signal and said occurrence indication signal; whereby said control signal is operative, in response to the presence of extraneous signals on a channel being utilized, to effect switching to the other channel.

2. Apparatus as defined by claim 1 wherein said speech recognition subsystem generates reject signals when said speech-indicative signal persists for a prescribed time without an occurrence indication occurring, and wherein said control means is operative in response to said reject signals for generating said control signal.

3. Apparatus as defined by claim 1 wherein said speech recognition system generates reject signals when said speech-indicative signals persist for a prescribed time without an occurrence indication occurring, and wherein said control means is responsive to said reject signal and said occurrence indication signal.

4. Apparatus as defined by claim 2 wherein said control means is operative in response to the occurrence of a predetermined number of reject signals per unit time.

5. Apparatus as defined by claim 3 wherein said control signal is operative in response to the occurrence of more than one reject signal in succession.

6. Apparatus as defined by claim 4 wherein said control means is responsive to the occurrence of two reject signals in succession or the occurrence of more than a predetermined number of reject signals per unit time.

7. Apparatus for transmitting and receiving audio signals including recognizable speech information of a predetermined restricted vocabulary, comprising:
 a. first and second parallel channels;
 b. means for applying said audio signals to said first and second channels;
 c. chanel selecting means responsive to a control signal for selecting said first or second channel;
 d. a speech recognition subsystem responsive to the audio signals transmitted over the selected channel, said speech recognition subsystem including means for determining the presence of speech-like sounds and for comparing portions of said audio signals which occur during said speechlike sounds with said predetermined vocabulary to determine the probable occurrence of a word from among said predetermined vocabulary, said subsystem generating reject signals when the comparisons do not indicate the probable occurrence of a word from among said predetermined vocabulary; and
 e. control means coupled to said speech recognition subsystem for generating said control signal as a function of said reject signals; whereby said control signal is operative, in response to the presence of extraneous signals on a channel being utilized, to effect switching to the other channel.

8. Apparatus as defined by claim 7 wherein said control means is responsive to the occurrence of more than one reject signal in succession.

9. Apparatus as defined by claim 7 wherein said control means is responsive to the occurrence of more than a predetermined number of reject signals per unit time.

10. Apparatus as defined by claim 7 wherein said control means is responsive to the occurrence of two reject signals in succession or the occurrence of more than a predetermined number of reject signals per unit time.

* * * * *